T. A. McCALL.
APPARATUS FOR AUTOMATICALLY OPERATING TYPE WRITERS.
APPLICATION FILED MAR. 19, 1908. RENEWED APR. 22, 1909.

996,993.

Patented July 4, 1911.
10 SHEETS—SHEET 1.

WITNESSES:

INVENTOR,
Thos. A. McCall,
BY Franklin H. Hough
ATTORNEY.

T. A. McCALL.
APPARATUS FOR AUTOMATICALLY OPERATING TYPE WRITERS.
APPLICATION FILED MAR. 19, 1908. RENEWED APR. 22, 1909.

996,993.

Patented July 4, 1911.

10 SHEETS—SHEET 3.

WITNESSES:

INVENTOR.
Thomas A. McCall,
BY
Franklin H. Hough
ATTORNEY.

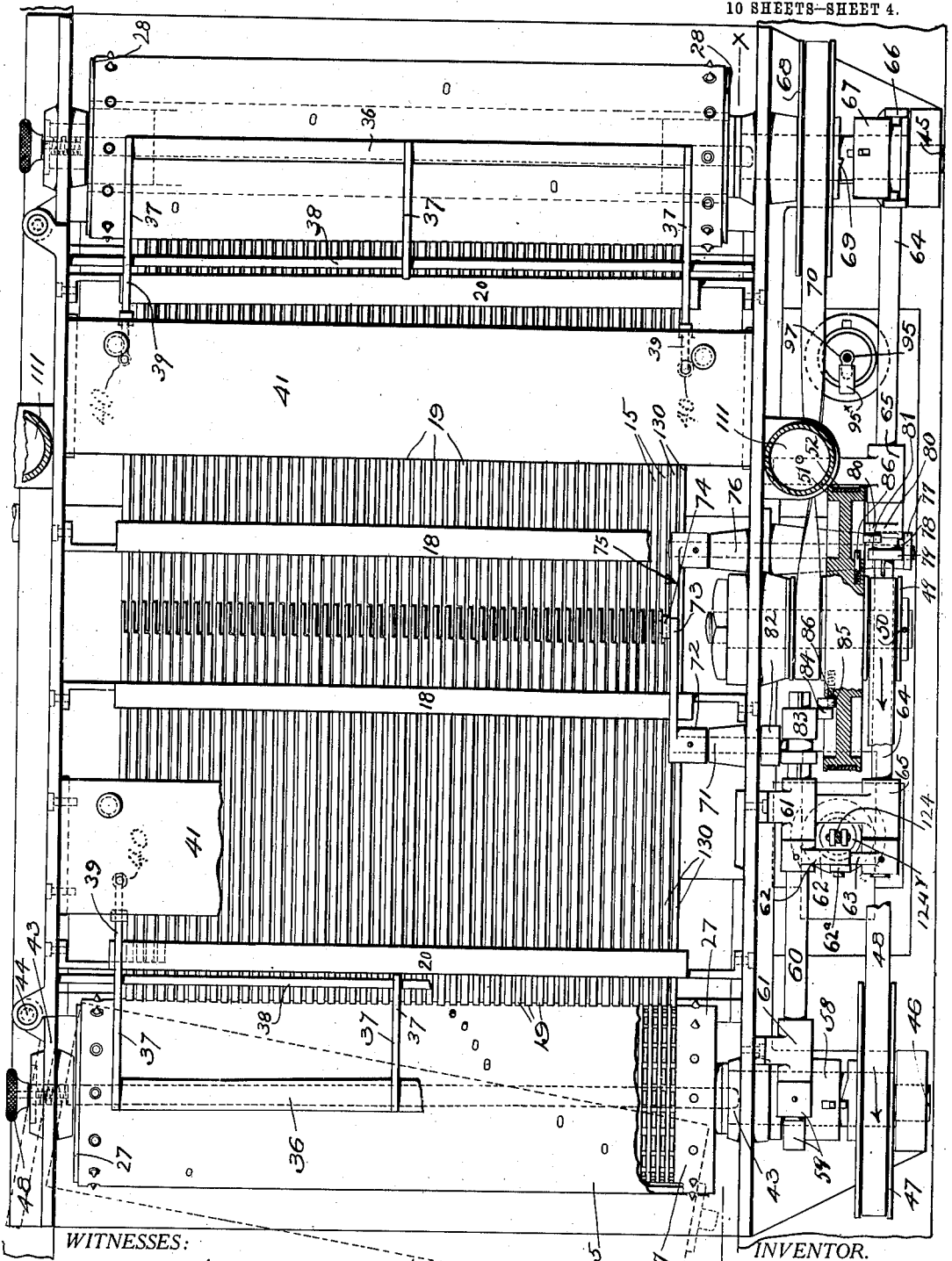

T. A. McCALL.
APPARATUS FOR AUTOMATICALLY OPERATING TYPE WRITERS.
APPLICATION FILED MAR. 19, 1908. RENEWED APR. 22, 1909.
996,993.
Patented July 4, 1911.
10 SHEETS—SHEET 5.
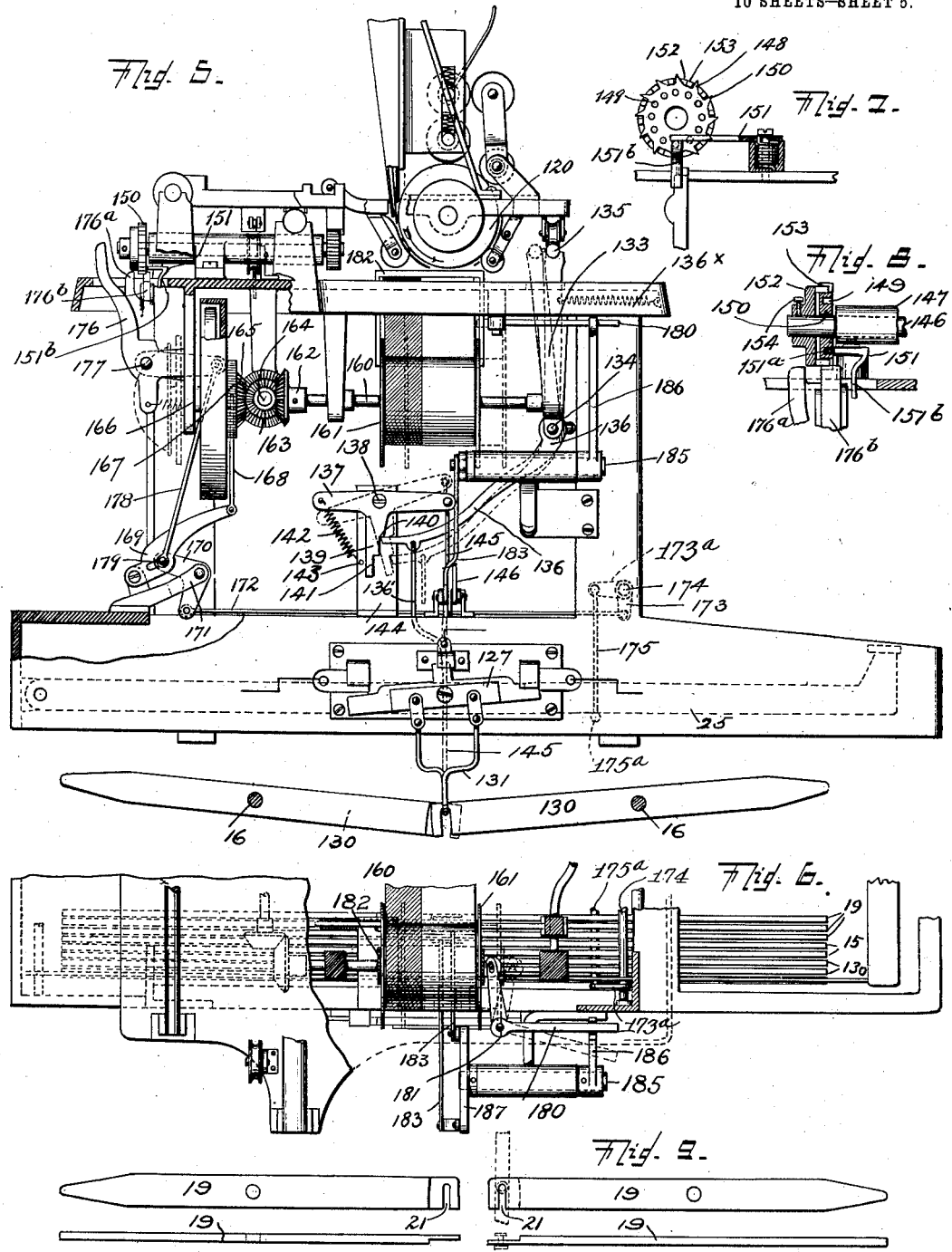

T. A. McCALL.
APPARATUS FOR AUTOMATICALLY OPERATING TYPE WRITERS.
APPLICATION FILED MAR. 19, 1908. RENEWED APR. 22, 1909.
996,993.
Patented July 4, 1911.
10 SHEETS—SHEET 6.
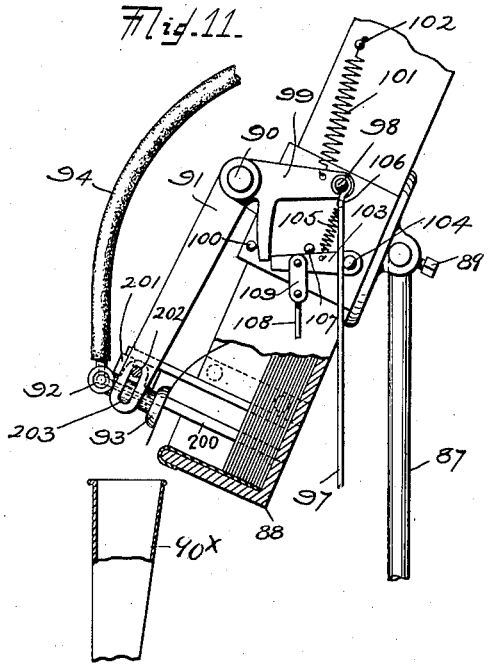
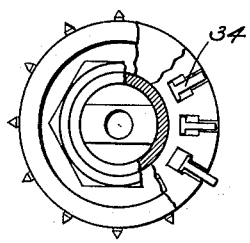
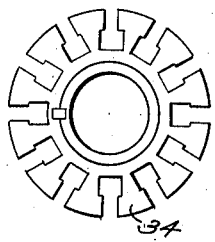
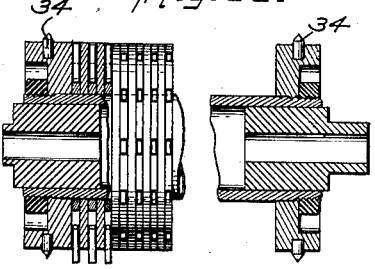
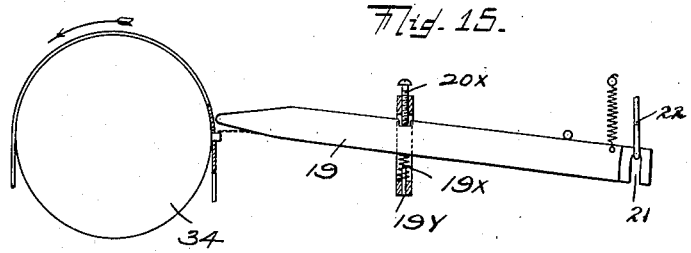
WITNESSES:
INVENTOR.
Thomas A. McCall,
BY
Franklin W. Hough
ATTORNEY.

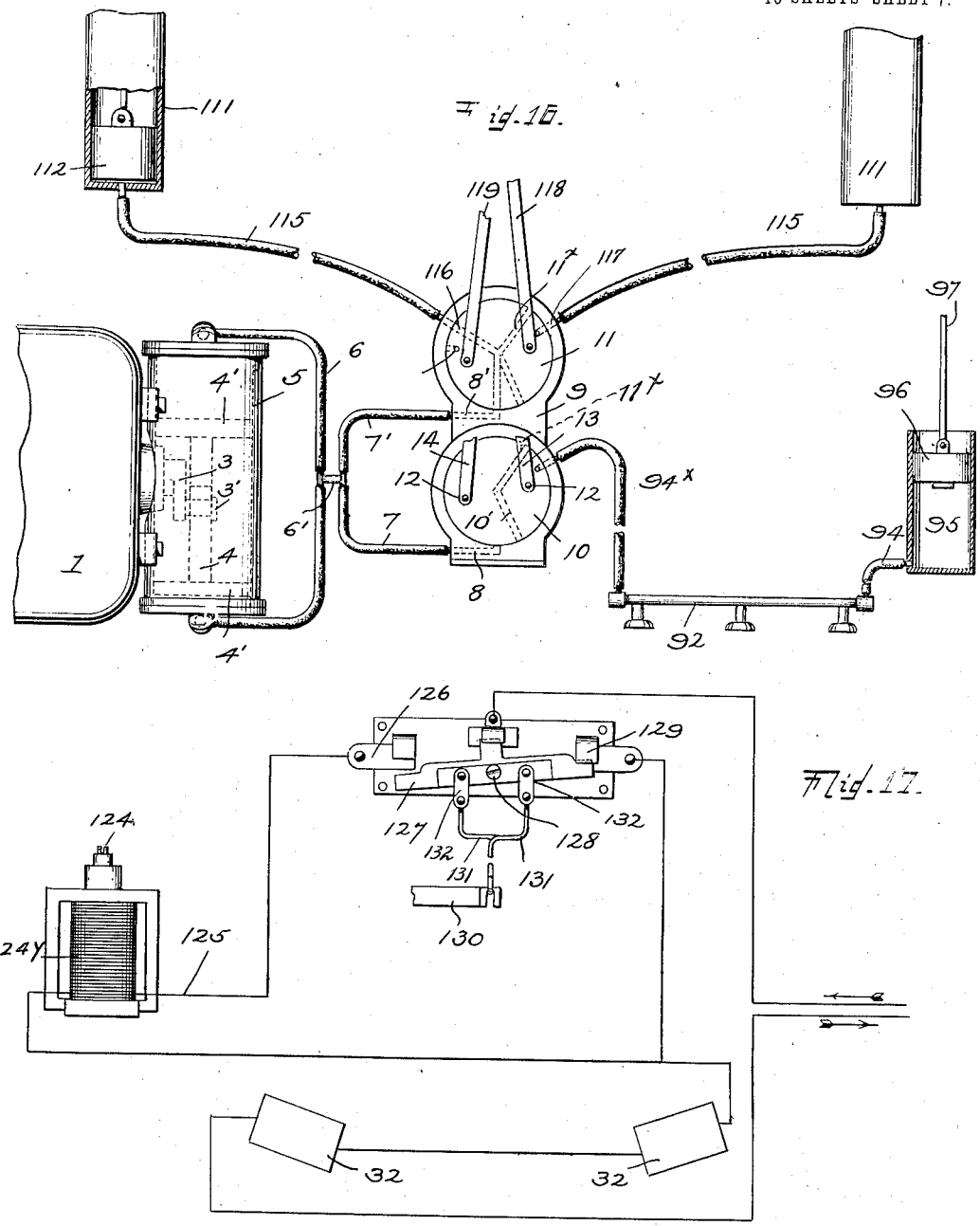

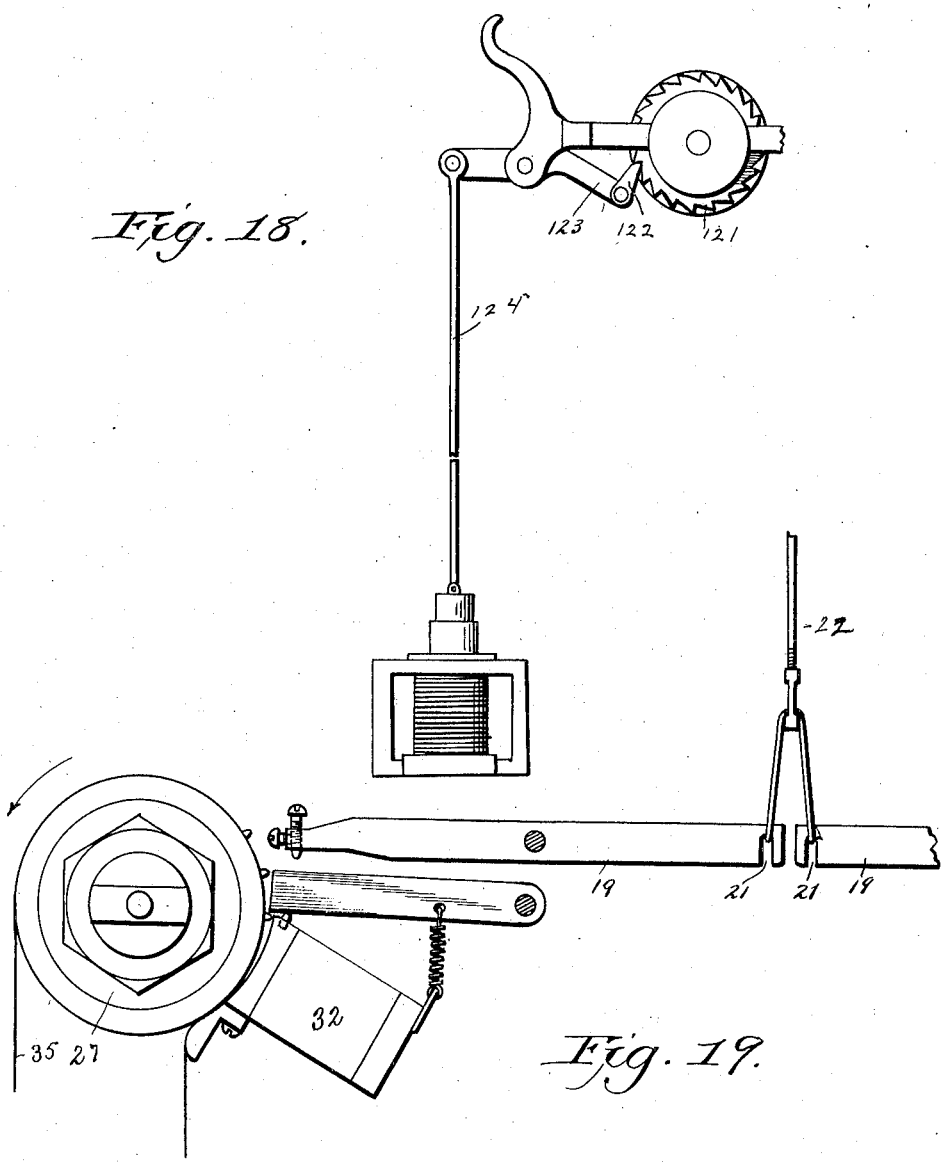

UNITED STATES PATENT OFFICE.

THOMAS A. McCALL, OF COLUMBUS, OHIO, ASSIGNOR TO THE AUTOMATIC TYPEWRITER COMPANY, OF CLEVELAND, OHIO, A CORPORATION OF OHIO.

APPARATUS FOR AUTOMATICALLY OPERATING TYPE-WRITERS.

996,993.     Specification of Letters Patent.     Patented July 4, 1911.

Application filed March 19, 1908, Serial No. 422,032. Renewed April 22, 1909. Serial No. 491,602.

*To all whom it may concern:*

Be it known that I, THOMAS A. McCALL, a citizen of the United States, residing at Columbus, in the county of Franklin and State of Ohio, have invented certain new and useful Improvements in Apparatus for Automatically Operating Type-Writers; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in apparatus for automatically operating typewriters and comprises a simple and efficient mechanism which may be applied to the ordinary typewriter and affords means whereby the type levers may be actuated as well as the feeding of the sheets and envelops to be used, the spacing and movement of the carriage automatically.

The invention comprises various details of construction, combinations and arrangements of parts which will be hereinafter fully described and then specifically defined in the appended claims.

My invention is illustrated in the accompanying drawings, in which:—

Figure 1:
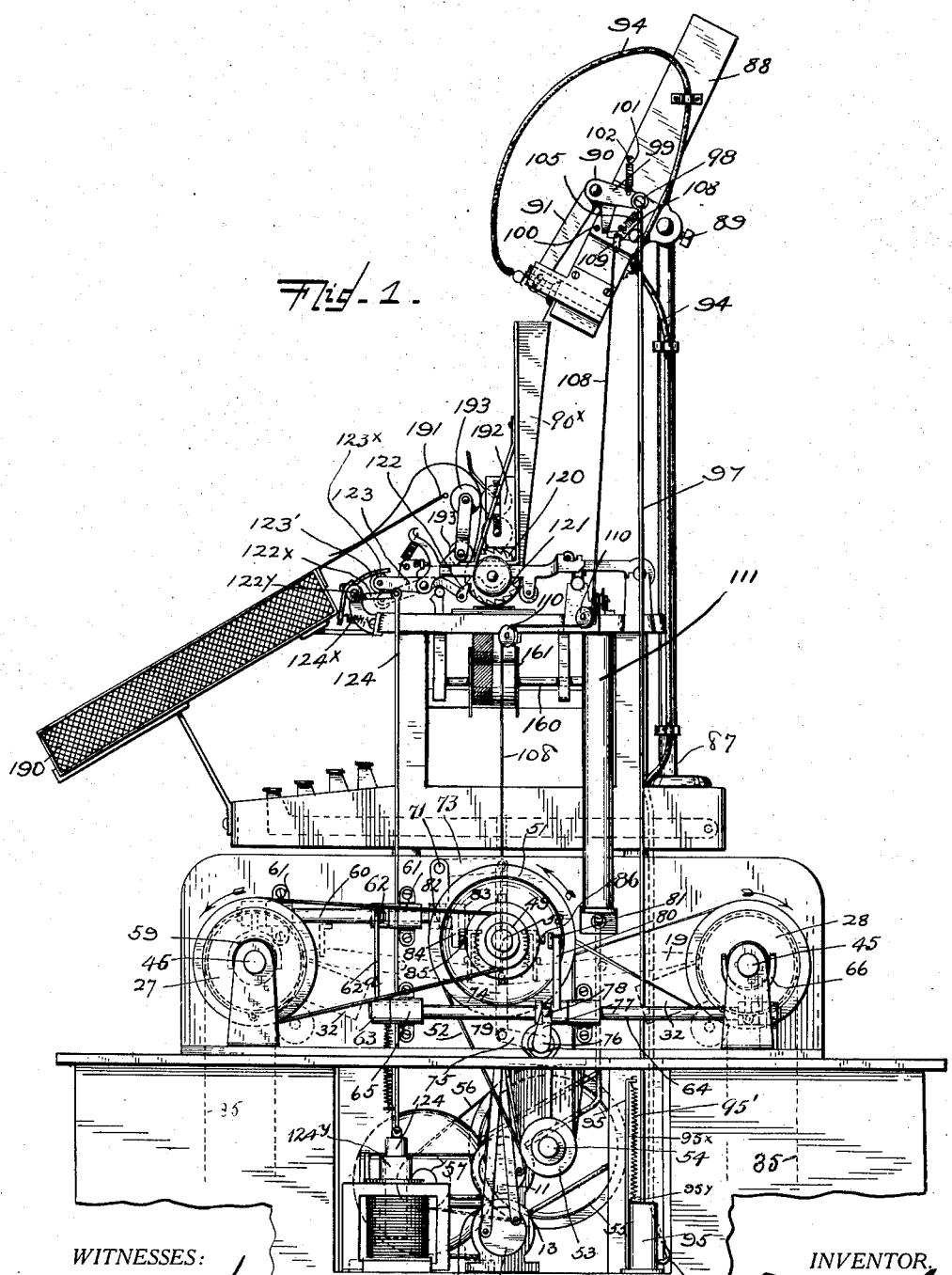
Figure 2:
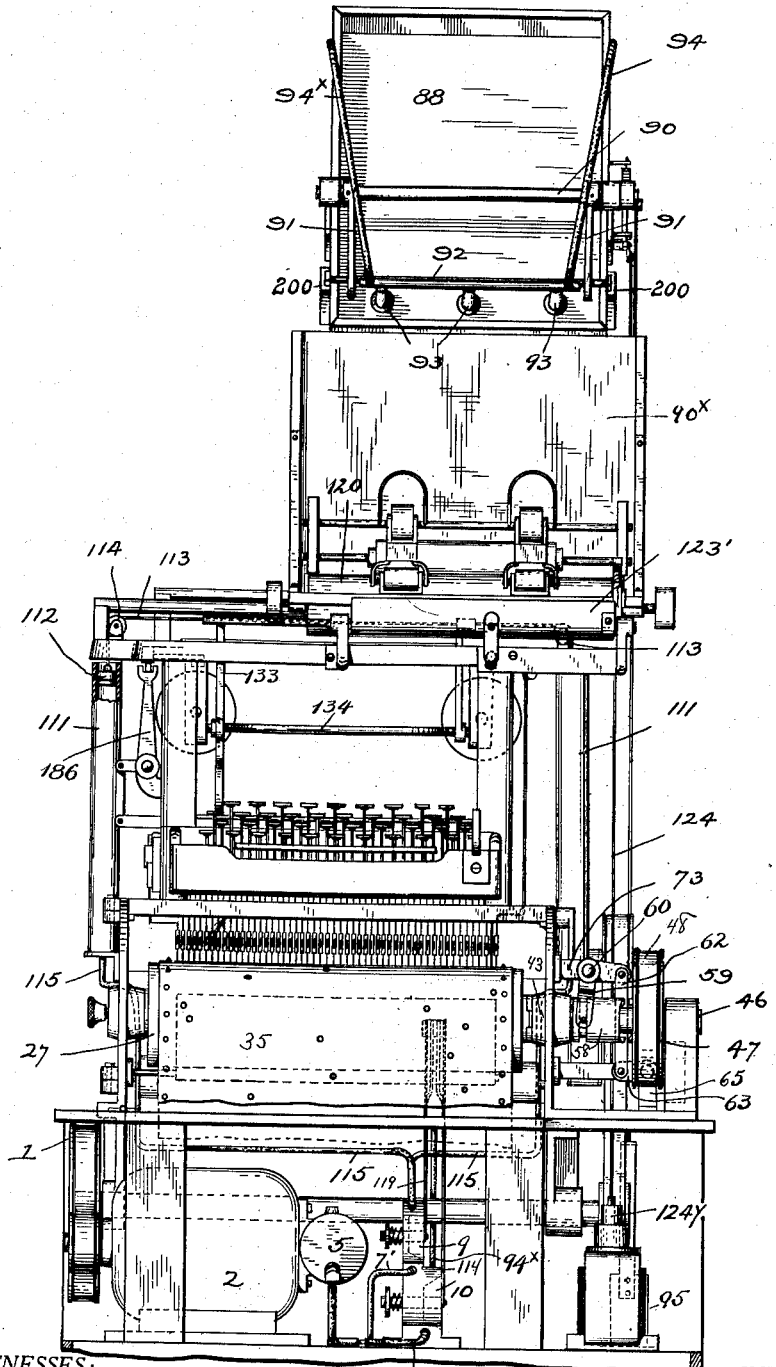
Figure 3:
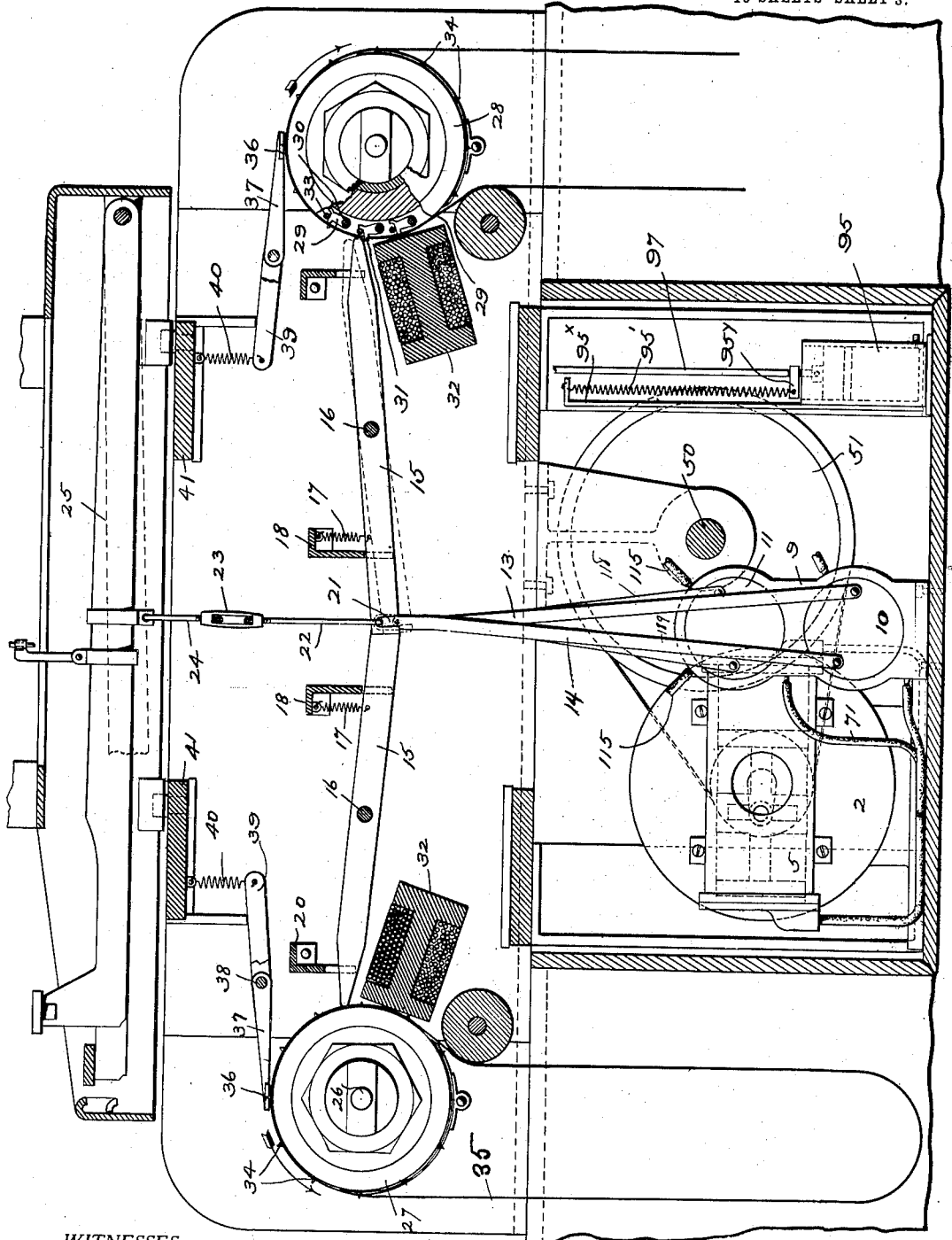
Figure 20:
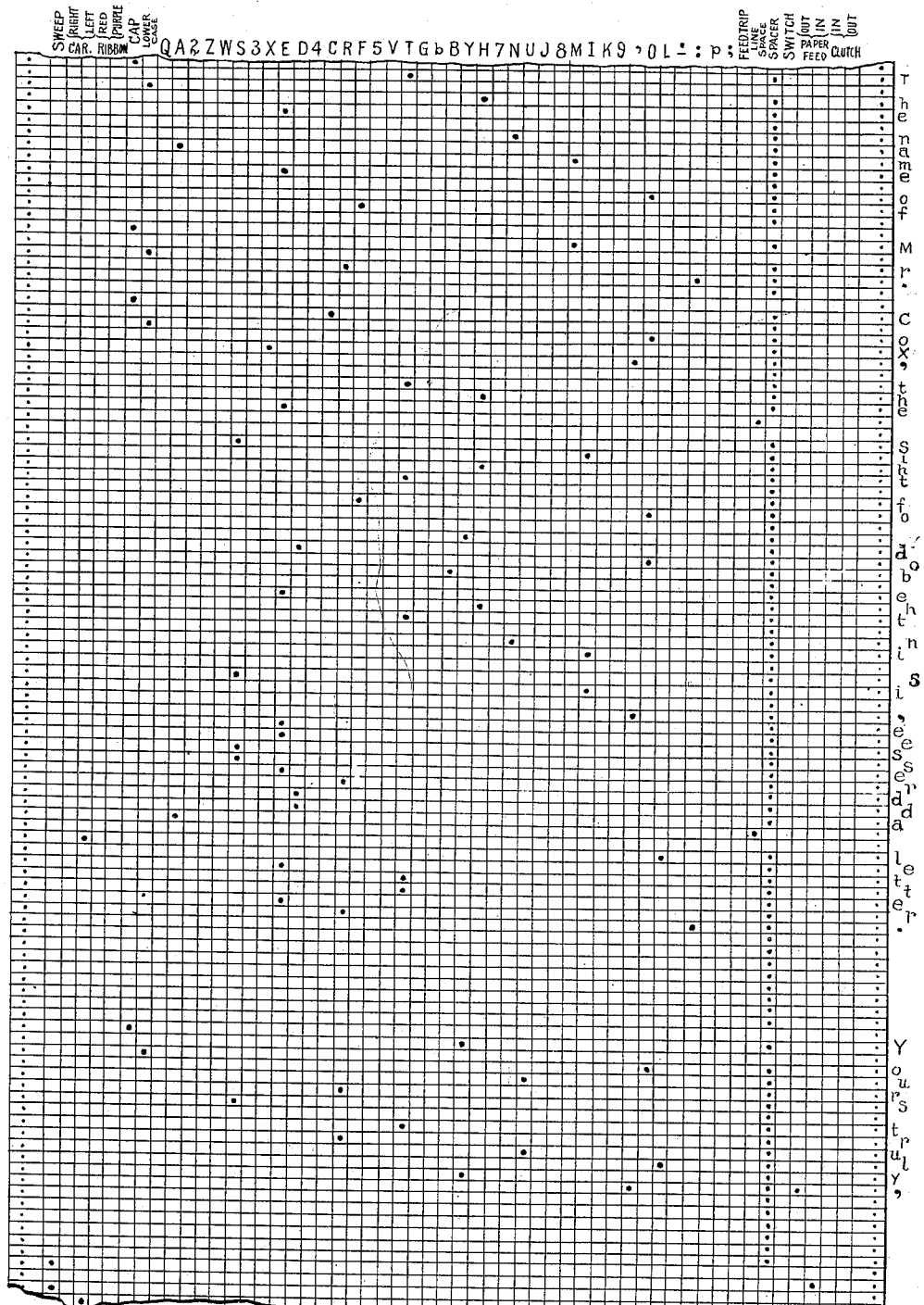
Figure 21:
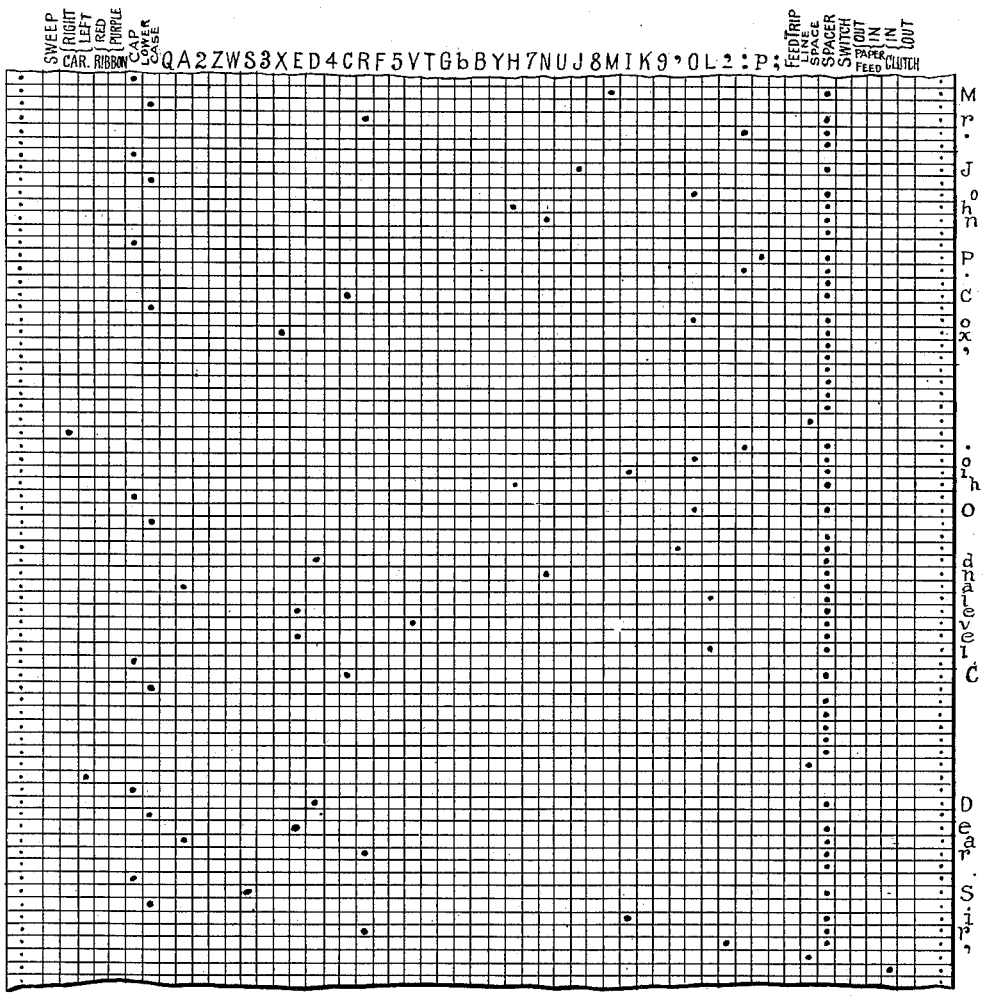

Figure 1 is a side elevation of the apparatus, showing parts of a cabinet upon which the same is mounted broken away. Fig. 2 is a front elevation, the paper basket illustrated in Fig. 1 being removed in order to disclose features of the invention. Fig. 3 is an enlarged sectional view taken on line x—x of Fig. 4 and showing particularly the mechanism for actuating the type bar levers. Fig. 4 is a top plan view of the apparatus upon which the typewriter frame is adapted to rest. Fig. 5 is a side elevation of the typewriter proper, showing the mechanism connected therewith for operating the ribbon shift, case shift, carriage, spacing, etc. Fig. 6 is a top plan view of a portion of the construction shown in Fig. 5, parts being broken away. Figs. 7 and 8 are detail views of the releasing dog for allowing the carriage to move in either direction. Figs. 9 and 10 are detail views of the trip levers which actuate the type bars of the typewriter. Fig. 11 is an enlarged detail view, parts being shown in section and illustrating the mechanism for raising the papers from a receptacle to be deposited through a chute to the platen where the paper receives the impressions from the type. Figs. 12, 13 and 14 are views showing slight modifications in the form of detailed construction of the drum, with means carried thereby for tripping the levers. Fig. 15 is a detailed view showing means for adjusting one of the type bar actuating levers. Fig. 16 is a diagrammatic view of the vacuum system showing the manner in which various pistons are adapted to be acted upon by suction from a vacuum proper. Fig. 17 is a diagrammatic view showing the mechanism for opening and closing circuits for causing the platen to be rotated. Fig. 18 is a detail view in elevation showing the preferred form of type bar operating levers, and Fig. 19 is a detail view in elevation of a slight modification of the invention. Fig. 20 is a diagrammatic view of a section of a perforated strip adapted to be employed in association with cylinder 27 for printing the body of a letter. Fig. 21 is a diagrammatic view of a section of a perforated strip adapted for use in association with the cylinder 28 for printing the address and formal salutation of a letter. In these figures the dots represent the perforations in the strip. The notations at the top of the vertical columns represent either the characters which will be printed as the result of the perforation in the corresponding vertical column, or else what mechanism in the machine will be caused to operate by such perforation. The letters at the right of these two figures show what letters and punctuation marks will be printed when the corresponding horizontal rows are brought into operative position. These letters also show the order in which the letters will be printed.

Reference now being had to the details of the drawings by numerals, 1 designates a cabinet in which a motor 2 is mounted, designed to be driven by any suitable source of power, and said motor has a crank shaft 3 projecting through its casing, as shown clearly in Fig. 16 of the drawings, the end of which shaft is connected by means of the pin 3′ to a piston rod 4 having pistons 4′ connected to each end thereof, which pistons are adapted to reciprocate within the cylinder 5.

6 designates a pipe communicating at its ends with the opposite ends of the cylinder 5 and 6′ designates a branching pipe communicating with the pipe 6 and communicating through the pipes 7 and 7′ with the ports 8 and 8′ respectively, which ports are formed in the casing 9. Mounted within the casing 9 are the two disk valves 10 and 11, having each a relief port 11$^x$, the former of which has an angled duct 10′ formed therein, the ends of which duct open through the circumference of the disk valve, and 12 designate pins projecting from the disk 10, and 13 and 14 designate two bars each pivotally connected to the levers 15 pivotally mounted upon the rods 16 supported within the cabinet. Springs 17 are fastened at their upper ends to the laterally projecting portion of the cross-piece 18 and their lower ends fastened to the levers 15, the purpose of said springs being to normally hold the levers in the position shown in solid lines in Fig. 3 of the drawings.

Mounted upon the rods 16 are levers 19 similar in construction to levers 15, a top plan view of which is shown in Fig. 4 of the drawings, and the outer end of all of said levers 19 and 15 are flush with one another. Positioned near the outer ends of each series of levers, which latter are tapered, are the slotted plates 20 in which the free ends of the levers are guided as they are tilted upon their pivots. Each of the levers 19 has, preferably, a slot 21 formed near its inner end and adapted to engage a hook or loop formed at the lower end of the rod 22, which latter is connected by means of a turn-buckle 23 with a rod 24 which in turn is fastened to one of the key bars 25 of the typewriter and designed to actuate a certain type bar, there being a lever 19 for each type character upon the typewriter. In other words, there are two series of levers 19, one series adapted to be operated by the triggers 29 on the cylinder 28 and one series adapted to be operated by the triggers 29 on the cylinder 27. These levers 19 are associated in pairs, one lever of a pair being taken from each series. The two associated levers overlap at their inner ends and the vertical slots 21 in said levers are in substantially the same vertical plane. The lower end of the bent rod 22 connected with a key lever 25 lies in the slot 21 in each of the levers of a pair. When one lever of the pair is operated by a trigger 29 it draws the bent rod 22 downward and operates the associated key 25, the rod 22 moving freely down in the slot 21 of the associated lever 19 of the pair under consideration. It is evident, therefore, that the operation of either of a pair of levers 19 will cause the operation of the associated typewriter lever 25 but will not cause any movement of the associated lever 19.

Mounted upon the spindles 26 are two cylinders, designated respectively by numerals 27 and 28 and shown clearly in Figs. 3 and 4 of the drawings, and which cylinders are provided with a series of grooves or apertures in the circumference thereof, in which the means for tripping the outer ends of the series of levers which are mounted upon the rod 16 are mounted. When the form of tripping mechanism as illustrated in Fig. 3 of the drawings is utilized, it comprises the triggers 29, each mounted upon a pivot pin 30 and each trigger has a projection 31 which is adapted to be drawn to its farthest outward limit by means of an electro-magnet 32 which is energized by being in a suitable electric circuit, as shown in Fig. 17 of the drawings. In order to limit the outer movement of said triggers or trips 29, pins 33 are so positioned that a projection of each trigger or trip will contact therewith in the manner shown clearly in Fig. 3 of the drawings.

In Figs. 12 to 14 inclusive are shown slight modifications of means for tripping the various levers, in which figures headed pins 34 are mounted within slots in the circumference of the cylinder and which are adapted to have reciprocating movements, their outer ends being brought beyond the circumference of the cylinders by means of an electro-magnet and designed to return to their normal positions by gravity as the cylinder rotates. Projecting from the circumference of said cylinders are the two series of pointed lugs 34, shown clearly in the drawings, and which are provided for the purpose of engaging perforations in the endless stencil strip 35, as shown clearly in Fig. 4 of the drawings, whereby the said strip may be fed as each cylinder rotates. In order to cause the various trips or triggers to be thrown back within the cylinder after having been withdrawn by the magnets for the purpose of tripping the levers, in case said trips should not fall back by gravity, the strips 36, shown in Figs. 3 and 4 of the drawings, are provided, each of which is pivotally connected by means of the arms 37 with the rods 38, upon which said arms are pivotally mounted. Fixed to each rod 38 is an arm 39, each of which is connected by means of a spring 40 with a cross-piece or plate 41 upon the top of the cabinet.

Each of the cylinders 27 and 28 is so arranged that each may be swung out into a position corresponding with that shown in dotted lines at the bottom of Fig. 4, this being accomplished by having each end of the spindle upon which the cylinder is mounted journaled in an angled arm 43 pivotally mounted at 44 upon the frame of the cabinet. By this adjustment of the cylinders, the endless stencil strip may be conveniently slipped over one end of the cylinder, after which the cylinder may be returned to the position shown in solid lines in the drawings.

Referring to Figs. 1 and 4 of the drawings, it will be observed that two shafts 45 and 46 are mounted in suitable bearings in the frame of the cabinet, one of said shafts being adapted to rotate with the cylinder 27, while the other rotates with the cylinder 28. 47 designates a grooved pulley which is loosely mounted upon the shaft 46, said pulley having a belted connection 48 with a pulley 49, shown clearly in Fig. 1 of the drawings, and which pulley 49 is fixed to a continuously rotatable shaft 50 journaled in suitable bearings in the frame of the cabinet. Mounted upon the shaft 50 is a pulley 51 adapted to be driven in the direction indicated by arrow in Fig. 1 by means of a belt 52 which travels about a pulley 53, fixed to a shaft 54. The shaft 54 has a pulley 55 fixed thereto which, by means of a belt 56, is driven by a pulley 57 upon the motor shaft, whereby power is transmitted continuously to the shaft 50 while the motor is in operation. 58 is a clutch collar, shown in Fig. 4 of the drawings, which is splined to the shaft 46, and 59 is a forked arm pivotally engaging said clutch collar 58 in the manner shown in Figs. 1 and 2 of the drawings. The forked arm 59 is fixed to a rock shaft 60 journaled in suitable bearings 61 upon the cabinet frame, and 62 is a crank arm which is fixed to the shaft 60 and is connected by links 62$^a$ with an arm 63, as shown in Fig. 4 of the drawings, which arm 63 is fixed to the shaft 64 journaled in the bearings 65, projecting from the cabinet frame. Said shaft 64 has a forked arm 66 fixed thereto which engages a clutch collar 67 splined to the shaft 45. A grooved pulley 68 is loosely mounted upon the shaft 65 and has a fixed clutch collar 69 projecting from the outer face thereof and adapted to be engaged by the clutch collar 67 when the latter is thrown against the same. 70 designates a belt which passes about the pulley 68 and also about a pulley upon the shaft 50. On Fig. 4 of the drawings will be seen in dotted lines a stub shaft 71 journaled in the frame of the cabinet and a boss projecting therefrom and to said shaft 71 is keyed a boss 72 having a laterally projecting arm 73 thereon, which is pivotally connected to a bar 74, a top plan view of which is shown in Fig. 4 of the drawings and in side elevation in dotted lines in Fig. 1. The lower end of said bar is pivotally connected to an arm 75 which is fixed to a crank shaft 76, having a crank arm 77 which carries an anti-friction pin 78 positioned in a groove in the splined collar 79 mounted upon the shaft 64. 80 designates an arm projecting from the splined collar 79 and carrying an anti-friction roller 81 near its free end. Fixed to the shaft 71 is a crank arm 82, the end of which engages a splined collar 83 mounted upon the shaft 60, and an arm 84 of said collar 83 is provided with an anti-friction roller 85 similar to the roller 81 referred to. On Fig. 4 of the drawings will be seen two spring-actuated pins 86 mounted in holes in the hub of the pulley 51 and shown in elevation in Fig. 1 of the drawings. Said pins are adapted to be held normally with their outer ends projecting outside of said holes by means of the springs bearing against their inner ends and serve as trips for the purpose of causing one or the other of the arms 80 or 84 to tilt for the purpose of rocking one shaft 64 or the other 60, accordingly as it may be desired to cause one cylinder 28 or the other 27 to be thrown out of gear.

Mounted upon the frame of the typewriter is a standard 87, shown clearly in Figs. 1 and 11 of the drawings, which standard carries a receptacle 88 at its upper end disposed at an inclination and adapted to hold sheets of paper or envelops to be printed upon. Said receptacle may be held in any adjusted position by means of the set screw 89 and is open upon its front face. Pivotally mounted upon said receptacle, shown clearly in Figs. 1 and 2 of the drawings, is a shaft 90 having arms 91 fixed thereto, which arms carry a tube 92 having suction cups 93 communicating therewith at intervals, and 94 designates a suction pipe communicating with the tube 92 and extending down, as shown in Fig. 1 of the drawings, to and communicating with a pneumatic cylinder 95, a detail sectional view of which cylinder is shown in the diagrammatic view Fig. 16 of the drawings. A spring 95' is connected at one end to a bracket arm 95$^x$ and its other end to a link 95$^y$ which is fixed to the rod 97, the purpose of said spring 95' being to move the rod 97 to and yieldingly hold it in its highest position. 96 is a piston mounted in the cylinder 95, and 97 is a rod connected at its lower end to said piston and its upper end is pivotally connected to a pin 98 projecting from an angle lever 99, which latter is pivotally mounted upon the shaft 90. 100 designates a pin adapted to serve as a stop to limit the throw of the angle lever 99 in one direction, and 101 is a spring fastened at one end to a pin 102 and its other end to the angle lever 99, the purpose of said spring being to normally hold the lever 99 at its farthest inner throw. A trigger 103 is pivotally mounted upon a pin 104 upon said receptacle 88 and is normally held at its farthest upper throw by means of a spring 105 which is fixed at one end to a pin 106 upon said receptacle, while its other end is fixed to the trigger 103. A pin 107 serves to limit the throw of the trigger 103 in one direction. A cord 108 is connected to the link 109, which in turn is pivotally connected to the trigger 103, as shown clearly in Figs. 1 and 11 of the drawings. Said cord 108 passes about the pulleys 110 journaled upon the frame of the typewriter, thence extends downwardly and is connected to one of the levers 19, shown in Fig. 1 of the drawings. A second pipe 94ˣ is connected at one end to the tube 92 with which it communicates and its other end is adapted to communicate with a port in the valve casing 9.

Mounted upon either side of the typewriter are pneumatic cylinders 111, each of which has a piston 112 mounted therein, and 113 designates a cable connected at one end to a piston 112 and said cable passes about the pulley 114 and its opposite end is fastened to the carriage of the typewriter at the rear thereof. Each cylinder 111 is provided with a similar piston and cable connection and provided for the purpose of causing the carriage to move in opposite directions. A pipe 115 communicates with the lower end of each cylinder 111 and leads to the disk valve casing 9, shown clearly in Fig. 16 of the drawings, one pipe 115 communicating with a duct 116 and the other with the duct 117 in the casing 9. Levers 118 and 119 are pivotally connected to the valve disk 11 and their upper ends respectively to the two levers 15.

The mechanism for moving the platen and paper comprises, in combination with the usual platen 120 and ratchet wheel 121 fixed thereto, a pawl 122 which is pivotally connected to a lever 123, and 124 designates a rod fastened at one end to an arm 122ˣ which is fastened in turn to a rock shaft 122ʸ. 123' designates a convexed plate which is fixed to the rock shaft 122ʸ and against which an anti-friction wheel 123ˣ is adapted to bear. A compression spring 124ˣ is interposed between said plate 123 and the frame of the machine and serves to normally hold the same in the position shown in Fig. 1 of the drawings and tilt down the outer end of the lever 123 as the rod 124 is drawn down by the solenoid 124ʸ. In Fig. 17 of the drawings, the solenoid is shown in electrical circuit. In Fig. 17 of the drawings, an electrical wire 125 is shown as connected to the winding of the solenoid and also to a contact point 126, and 127 is a switch make and break bar pivotally mounted upon a pin 128, and 129 designates a second contact point against which and the point 126 the bar 127 is to be alternately brought in contact for the purpose of causing a reciprocating movement to the rod 124 of the solenoid as the circuit is opened and closed by the actuation by one of the levers 130. As the right hand end of the lever 127, as shown in Fig. 17 of the drawings, is closed, the circuit will be through the wire and electro-magnets 32, as indicated by arrow. When the bar 127 is tilted so that its opposite end is closed, the circuit will be through the wire 125 and the solenoid connected therewith and thence through the electro-magnets, as indicated by arrow. Two bent rods are connected by means of links 132 with the bar 127 on opposite sides of the pivot of the latter. These rods 131 at their lower ends are engaged by two levers 130 so that by the actuation of one of these levers the bar 127 will be rocked in one direction so as to, for example, bring one end into electrical contact with one of the contacts 129, and by operating the other lever 130 said bar 127 will be rocked in the contrary direction to bring one of its ends in electrical engagement with the other contact 126. The various levers 19 are adapted to actuate the various type bars, while the levers 15 operate the pneumatic valves, and the levers 130 actuate the make and break electric mechanism. The two latter sets of levers are the four levers indicated near the bottom of Fig. 4 of the drawings.

The mechanism for operating the case shift of the typewriter to cause capital letters to be printed is illustrated in Fig. 5 of the drawings, in which 133 designates an arm, there being two of said arms in alinement with each other which are fastened to a rock shaft 134, said arms carrying the usual track 135 upon which the wheels of the carriage travel. 136 designates an arm which is fixed at one end to the shaft 134 and its other end is adapted to be held in adjusted positions by means of the angle lever 137 which is pivoted upon a pin 138. A rod 136' is connected at one end to the arm 136 and is adapted to be actuated by one of the levers 19 to which it is connected. A spring 136ˣ is fastened at one end to the typewriter frame and its other end to the arm 133 and tends to draw the arm to which it is attached back to its normal position, as shown in solid lines in Fig. 5. Each of the arms 133 has a spring 136ˣ connected thereto for the same purpose. An arm 139 of said lever 137 has two steps or notches 140 and 141 formed in the marginal edge thereof, the former of said steps or notches adapted to be engaged by the arm 136 when the carriage is at its rearmost position and, when the carriage is moved forward to write caps, the arm 136 is designed to engage the step 141 in the manner shown in dotted lines in Fig. 5 of the drawings. A spring 142 is fastened at one end to one end of the lever 137 and its other end to a pin 143 mounted upon a bracket 144 of the typewriter frame. A rod 145 is fastened at its upper end to an arm of the lever 137 and its lower end is fastened to one of the levers 19 and provided for the purpose of drawing down the lever 137 to the position shown in solid lines in Fig. 5 when it is desired to return the carriage to its normal position after printing the caps on the paper case.

In the machine shown letters are printed when the carriage is being moved in both directions, and in order that this may be done the escapement mechanism provided is such as to permit the carriage to move in the usual step by step manner when being pulled in either direction. The step by step movement of the carriage from right to left, which is the direction in which typewriter carriages usually move while the characters are being printed, may be controlled by the usual escapement employed for this purpose. Such escapement in the form in which it is used on the Remington typewriter is shown in the drawing. It includes a lever 176 pivoted so as to rock on the pivot or shaft 177. Fixed to this lever is the pawl 176$^b$ which is permitted a limited movement sufficient to permit the escapement wheel 150 to turn the distance between two teeth. This is, as before stated, the usual escapement employed and should need no further description. When, however, the carriage is put under tension tending to move it from left to right, a spring pawl 151 becomes effective. This is pivoted on a vertical pivot adjacent to the escapement wheel and is under a spring tension tending to swing it toward the escapement wheel. In the back of the escapement wheel are small holes 149 equally spaced and equally numbered to the number of teeth on the escapement wheel. A part 151$^b$ of the spring pawl 151 lies in the path of the escapement lever 176. When this lever is swung to the right as shown in Figs. 5 and 8, it will strike the part 151$^b$ of the pawl 151 and will push it away from the escapement wheel, immediately following which the pawl 176$^a$ will enter between the teeth of the escapement wheel. In so moving the lever 151 is moved so as to withdraw the finger 151$^a$ from the hole 149 into which it projected. Now when the lever 176 swings to the left as shown in Figs. 5 and 8 and the pawl 176$^a$ becomes disengaged from the escapement wheel, said wheel will be turned because of the pull to the right upon the carriage. The pawl 151 has, however, been allowed to swing against the face of the wheel and when a hole 149 is, by the turning of the wheel, brought into alinement with the finger 151$^a$, this finger will move quickly into said hole and will stop further turning of the escapement wheel. The wheel, however, will have been moved to an arcual distance corresponding to the distance between two adjacent holes. When the carriage is moved from left to right this pawl 151 will be moved in one direction by its spring and in the other direction by pressure from the lever 176, but will perform no function in controlling the turning of the escapement wheel. In that event, as before stated, the distance which this wheel was turned is determined by the possible movement of the movable pawl 176$^b$. When the carriage is moving from right to left this pawl 176$^b$ has no function; it is the pawl 151 which determines the extent of each movement of the escapement wheel.

In order that the typewriter shall automatically print when the carriage is moving in both directions, it is necessary that the perforated strip be provided with perforations which will control the operation of the typewriter keys. Strip sections properly perforated for this purpose are shown on Figs. 20 and 21, which figures are, as stated, diagrammatic. The cross lines on these figures represent the step by step movement of the strip through the machine. The vertical columns represent the parts of the strip which control the triggers associated with the various characters and mechanisms indicated. The strip section shown in Fig. 21 is adapted to cause the machine to print the address Mr. John P. Cox,
Cleveland, Ohio.
Dear Sir:

This strip is intended to be run through the machine in the direction indicated by the arrow. The dots in the various squares indicate perforations and they are so placed that "Mr. John P. Cox" is printed while the carriage is moving from right to left. The perforations for the line "Cleveland, Ohio," are placed in the reverse direction and are printed in the reverse order while the carriage is being moved from left to right. The words "Dear Sir" are printed while the carriage is moving from right to left. In the last horizontal row shown in this figure is a dot representing the perforation which controls the operation of the clutch mechanism, said operation being such that the address cylinder 27 is disconnected from the power mechanism; while at the same time the other cylinder is connected with the power mechanism and begins to turn and to immediately write the letter, the perforated strip for which is shown in Fig. 20. This letter is as follows:

The name of Mr. Cox, the addressee, is in the body of this letter.
Yours truly,

The perforations indicated by the dots are so arranged that the line "The name of Mr. Cox, the" is printed while the carriage is moving from right to left. The words "addressee is in the body of this" is printed while the carriage is moving in the reverse direction. The next line "letter", and the words "Yours truly" are printed while the carriage is moving from right to left. In other words, the perforations in the governing perforated strips are arranged so that for alternate lines the perforations are arranged in the order in which the letters are to appear when the letter is read in the ordinary manner, and the intermediate lines are arranged in the reverse order.

The mechanism for driving the ribbon consists of the shaft 160 mounted in suitable bearings upon the frame of the apparatus and upon which shaft the reel 161 is mounted. 162 designates a miter gear wheel upon the shaft 160 and which is in mesh with a similar gear wheel 163 upon the shaft 164, and 165 is a miter wheel which is in mesh with the wheel 163 and is mounted upon the shaft 166. A ratchet wheel 167 is fixed to rotate with the wheel 165, and 168 is a pawl which is adapted to engage the ratchet wheel 167 and is pivotally connected to an arm 169 which in turn is pivotally connected to an angle lever 170 mounted upon the bracket arm 171. The mechanism for operating the angle lever 170 is that usually employed in typewriters for this purpose. A universal bar 175$^a$ lies beneath all of the typewriter levers so as to be moved down whenever any one of them is moved down. This universal bar 175$^a$ is connected by two links 175 with two arms 173$^a$ fixed to a rock shaft 174. This rock shaft has an arm 173 fixed to it, and this arm is connected by the link 172 with one arm of the angle lever 170. A lever 176 is pivotally mounted upon the pivot 177 and is a part of the usual mechanism upon the typewriter and is connected with a rod 178 which in turn is connected by means of a pin 179 with the angle lever 170 and coöperates with the escapement mechanism but forms no part of the present invention. In order to shift the reel carrying the ribbon from the position shown in solid lines to that illustrated in dotted lines in Figs. 5 and 6 of the drawings, the following mechanism is employed:—An angle lever 180 is pivotally mounted upon a rock shaft 181 and one end of the lever 180 is connected to the sliding yoke 182 which embraces the reel. A rock shaft 185 has a forked arm 186 which engages one arm of the lever 180 so that by the rocking of said rock shaft 185 said lever may be rocked and the yoke 182 moved in one direction or the other, thereby moving the reel 161. An arm 187 is fixed to the rock shaft 185 and said arm is connected on opposite sides of said shaft with two links 183, the lower ends of which are respectively connected with two of the levers 19,—one in each series of said levers. Mounted at any suitable location with reference to the machine is a basket 190 having an extension 191 projecting from the upper end thereof and upon which the paper, which has been printed, contacts as shown in Fig. 1 as it is guided into the basket. Spring-pressed anti-friction rollers 192, shown in Fig. 1 of the drawings, and also the rollers 193 are provided, between which the paper as it passes about the platen after receiving the impression is fed upward before it passes into the basket.

On Fig. 11 of the drawings will be seen a guide-way 200, there being one upon either side of the receptacle 88 which holds the paper, and 201 designates a cross-head, one being mounted in each guide-way. 202 designates a shaft fixed to said cross-heads and extending into the elongated slots 203 in the arms 91 and to said rod the pipe 92, which communicates with the suction cups, is connected.

In Fig. 15 of the drawings, I have shown means for adjusting the tilting levers 19, in which a spring 19$^x$ is mounted upon a pin 19$^y$ and bears yieldingly against the under edge of the lever, while a set screw 20$^x$ is provided and which is adjustable to regulate the throw of the lever 19.

The operation of my apparatus is as follows:—Endless perforated strips are placed about the two cylinders 27 and 28, one of the said strips being adapted to contain perforations representing addresses, while the other strip contains perforations for the body portion of the letter. As the cylinders 27 and 28 are rotated, the spurs 34 thereon, engaging the feeding perforations along the marginal edges of the strips, will cause the same to be fed forward and, as a certain perforation in one of the said strips comes opposite a trigger or trip 29, a lever 15 will be tilted by the projecting trigger coming in contact with the end of the lever and will cause the valve disk 11 to be thrown to the position shown in Fig. 16 of the drawings, in which there will be direct communication between the vacuum chamber 5 and the pneumatic cylinder 111 upon one side of the typewriter frame, causing the piston 112 in said cylinder to be drawn down to the position shown in said Fig. 16, indicating that the typewriter carriage with the platen mounted thereon has been drawn to its limit to the left. As the carriage of the typewriter approaches its farthest limit in one direction, said carriage being drawn by means of the cable connecting the same with the piston in the cylinder 111, a perforation in one of the moving strips will uncover a certain trip or trigger which is drawn through the perforation by means of the electro-magnet and will cause the lever 15 to tilt which is connected to the disk valve 11 by means of the lever 119 and cause the port 117 to be thrown into registration with the pipe 115, which leads to the cylinder upon the right side of the typewriter and cutting off the suction leading to the other cylinder 111. This will cause the cable which is fastened to the piston in the cylinder upon the right side of the machine to be drawn in the opposite direction, therefore effecting a printing upon the paper as the platen moves in opposite directions longitudinally. The sheets of paper or alternate sheets of paper and envelops which are placed in the receptacle 88 are raised therefrom simply and deposited through the chute and carried about the platen by the following mechanism:—As a certain perforation in one of said endless strips uncovers a trip or trigger in the cylinder, said trip will cause a lever which is connected to the cable 108 to be drawn down and with it the pivotal link 109 and, as the lever 103 is withdrawn from contact with the projecting end of the angle lever 99, the spring 101 will cause the suction cups 93 to be drawn down into the receptacle 88. Immediately after the cups have reached their farthest downward throw within the receptacle 88, a perforation in one of the strips will uncover a certain other trip or trigger which, as it passes the magnet, will be drawn through the perforation and into the path of another tilting lever which will actuate the bar 14, causing the disk valve 10 to make a partial rotary movement to bring the duct 10' so as to communicate between the pipe 94$^x$ and the pipe 7, thereby causing a suction within the cylinder 95 below the piston therein and also a suction at the various cups. The suction drawing through the cups is adapted to cause a sheet of paper to cling thereto, while the cups are being swung to the position shown in Fig. 1 of the drawings. The rock shaft 90, to which the cups are connected, is rocked by means of the suction drawing upon the piston 96 within the cylinder 95, the spring 105 causing the link 103 to assume the position shown in Figs. 1 and 11 immediately behind the finger upon the angle lever 99, which will hold the cups with the paper still clinging thereto in the positions shown in Figs. 1 and 11. At a predetermined moment, when a certain perforation in one of the endless strips uncovers a trip or trigger, the latter will be drawn through the perforation by the magnet and cause a lever connected to the bar 13 to be actuated which will throw the port 10' out of communication with the pipe 94, thereby destroying the vacuum in the cups and allowing the sheet of paper to drop down through the chute 90$^x$ to a position where it is fed about the platen.

The sheet of paper or envelop which is to be printed is fed forward about the platen by mechanism actuated by the make and break means, shown in Fig. 17 of the drawings. Distinct perforations in one of the strips uncovering certain trip and triggers will allow magnets to draw the latter through the perforations and in the path of two of the tilting operating levers, both of which are connected to the pivotal circuit closing bar 127 upon either side of its pivot, thereby causing said bar 127 to rock rapidly into contact alternately with the points 126 and 129. As the circuit is thus closed and broken, the solenoid 124$^y$ will be energized and deënergized, causing a reciprocating movement to be imparted to the rod 124 which will cause an intermittent movement to be imparted to the platen. The paper or envelop to be printed upon being thus fed forward to the proper position to receive the printed matter, the address printing strip is started in motion by the clutch mechanism shown in Figs. 1 and 4 of the drawings. In said Fig. 4 of the drawings, the clutch mechanism upon the address cylinder is thrown out of gear, while the clutch mechanism upon the cylinder for printing the body portion of the letter is in gear. When a certain perforation upon the endless strip upon the cylinder representing the perforations for the body portion of the letter uncovers a trip or trigger it will engage with that tilting lever which is connected with the arm 73. This arm it will be remembered is secured to the rock shaft 71 to which the arm 82 is fixed, which arm, by its engagement with the sleeve 83, so moves it, and causes the angle lever 82 to tilt which is connected to an arm upon the rock shaft, having an arm 76, which movement will cause the arm 80 which is fixed to the rock shaft 64 to be positioned in the path of the spring-actuated pin 86, shown in Fig. 4 of the drawings. Simultaneously with the throwing of the arm 80 into the path of said spring-pressed pin, the splined collar 83, which is connected to the crank arm 82, will be thrown longitudinally upon the shaft 60. As the pin 86 comes in contact with the anti-friction roller 81 upon the arm 80, the crank shaft 64 will be rocked in its bearings and the clutch collar 67, shown in Fig. 4 of the drawings, will be thrown into engagement with the clutch upon the pulley 68, causing the cylinder 28 to rotate in the direction shown by arrows in Figs. 1 and 3 of the drawings. Simultaneously with the rocking of the shaft 64, the shaft 60 will be rocked by the pivotal arm connections connecting the two shafts and the clutch 58 will be thrown out of gear with the clutch upon the pulley 47 and the cylinder will be at rest, while the address strip is in operation and vice versa.

As the various triggers or trips have passed by the levers which they are adapted to tilt, they are thrown back within the cylinder by means of the strips 36 which are positioned adjacent to the circumferences of the cylinders, as shown clearly in Fig. 3 of the drawings.

In Fig. 4 of the drawings, it will be noted that the clutch collar indicated by numeral 58 is in operative connection with the pulley 47, thus causing, when the apparatus is in operation, the cylinder 27 to rotate in the direction of the arrows illustrated in Fig. 3. As the various perforations of the strip about the cylinder 27 pass over the cylinder 27, the electro-magnet 32 will cause a trip or trigger to be drawn through a perforation in the strip and which trigger, as it contacts with the end of one or another of the levers 19, will cause the latter to tilt and, through the connections between the tilting lever and the key operated lever 25 and its connections with a type bar, the latter will be thrown against the platen. As the space bar is operated, the words are spaced by the escapement mechanism.

It will be noted that the cups which raise the sheets of paper or envelops to be printed upon remain in the position shown in Fig. 1 of the drawings until it is time to feed a second sheet forward to the platen and a certain perforation in one of said strips will allow a trigger to be drawn through by the electro-magnet to trip a lever which will cause the trigger 103 to be withdrawn from the angle lever 99, which will allow the cups to be thrown down into the receptacle to receive another sheet or envelop. After an address has been written by the mechanism described, a perforation in the address strip will allow mechanism to be actuated for throwing the cylinder upon which the address strip is mounted out of gear and simultaneously therewith rock the shaft 60 so that an arm 84 upon the splined collar 83 will be positioned in the path of the pin 81 which will cause the shaft 60 to rock and the clutch collar 58 to be thrown into engagement with the clutch upon the hub of the pulley 47 and cause the cylinder upon which the perforated strip for determining the printing of the body portion of the letter to rotate.

In the event of it being desired to print the upper case or caps, the carriage and platen are moved horizontally in a direction at right angles to the longitudinal movement of the platen by means of one of the trips or triggers tilting a lever which will cause the angle shaft 134 to rock in its bearings which shaft is connected by means of the arm 136 and rod 136' with the lever that is tilted. This being done, the spring 142, shown in Fig. 5, will cause the angle lever 137 to tilt to the position shown in dotted lines and the end of the arm 136 will rest in the notch 141. The carriage will be held in its adjusted position to print the cap until a second lever is tilted which will cause the rod 145 to be drawn down to allow the end of the arm 136 to enter notch 140, after which the spring 136ˣ will return the carriage to its normal position.

If it is desired to shift the ribbon reels in order to bring different portions of the ribbon intermediate the type and the platen, it is accomplished by the rocking of the shaft 181 which, through the arm projecting therefrom, will cause the lever 180 to tilt and the reel to be moved to the position shown in dotted or solid lines in Figs. 5 and 6 of the drawings.

From the foregoing, it will be noted that, by the provision of the apparatus shown and described, an efficient and practical means is afforded whereby all of the operative parts of the typewriter are actuated automatically, the paper or envelops upon which the printing is to be done being automatically fed to the platen, series of distinct addresses printed upon different sheets or envelops while the body portion of the letter may be printed automatically following one distinct address. It will also be noted that the printing is effected while the carriage of the typewriter is moved in either direction and the spacing as well as the returning of the carriage to its starting position being entirely automatic in its action and all movements being predetermined by the perforated strips which allow tripping mechanism actuated by magnetic force to operate levers for operating the various mechanism.

What I claim to be new is:—

1. In automatic mechanism for operating typewriters, the combination of a rotatable cylinder, longitudinal rows of trips movably mounted thereon, a perforated strip, means for moving the strip in unison with and close to said cylinder, an electro-magnet positioned adjacent to the cylinder and adapted to draw the trips through the perforations of the strip, and a series of levers adapted to be engaged and tilted by said trips.

2. An automatic mechanism for operating typewriters comprising a rotatable cylinder, a series of movable trips mounted thereon, a perforated strip designed to move over said cylinder, an electro-magnet positioned adjacent to the cylinder and designed to draw the trips through the perforations of the strip, a member held adjacent to the cylinder and strip and adapted to engage the trips and return them to their normal positions, and a series of levers adapted to be tilted by the trips.

3. An automatic mechanism for operating typewriters comprising a rotatable cylinder, a series of movable trips mounted thereon, a perforated strip designed to move over said cylinder, an electro-magnet positioned adjacent to the cylinder and designed to draw the trips through the perforations of the strip, a series of levers positioned with corresponding ends in the path of the trips, means for guiding said levers as they tilt, and a spring connected to each of said levers and adapted to return it to its normal position, as set forth.

4. An automatic mechanism for operating typewriters comprising a rotatable cylinder, rows of trips pivotally mounted in recesses in the surface of said cylinder, a perforated strip running over and movable with said cylinder, means for limiting the outer throw of each trip, an electro-magnet for drawing the trips through the perforations of the strip, tilting levers operated by said trips, and connections between the levers and the type bars of the typewriter.

5. A controller strip having in it perforations for controlling the operation of the typewriter levers, which perforations are disposed in different transverse sub-divisions of the strip in accordance with the characters they represent, and are disposed in equally spaced longitudinal sub-divisions of said strip,—one series of said perforations, viz., those representing a line of characters being placed longitudinally of the strip in the order in which the characters are to be printed, and the next following series of perforations, viz., those representing the next line of characters being placed longitudinally of the strip in the reverse order in which said characters are to be printed, and so on.

6. A controller strip having in it perforations for controlling the operating of the typewriter levers, which perforations are disposed in different transverse sub-divisions of the strip in accordance with the characters they represent, and are disposed in equally spaced longitudinal sub-divisions of said strip,—one series of said perforations, viz., those representing a line of characters being placed longitudinally of the strip in the order in which the characters are to be printed, and the next following series of perforations, viz., those representing the next line of characters being placed longitudinally of the strip in the reverse order in which said characters are to be printed, and so on, and there being other perforations intermediate of said several series of perforations, combined with mechanism controlled by the series of perforations for actuating the type bars of a typewriter, the carriage of said typewriter, two mechanisms for respectively traversing said carriage in opposite directions, mechanism controlled by said intermediate perforations, for throwing one of said two mechanisms out of action and for throwing the other into action, and escapement mechanism for controlling the movement of said carriage in both directions.

7. In automatic mechanism for operating typewriters, the combination of a perforated strip, mechanism controlled by said strip for operating the type bars, means for alternately traversing the typewriter carriage in opposite directions, and double acting escapement mechanism for controlling the movements of said carriage in both directions.

8. In automatic mechanism for operating typewriters, the combination of a rotatable cylinder, rows of trips movably mounted thereon, a perforated strip, means for moving the strip in unison with and close to said cylinder, means adapted to move the trips through perforations in said strip, a series of levers adapted to be tilted by said trips, means actuated by said levers for operating the type bars, means which are thrown into and out of action by some of said levers for traversing the typewriter carriage in both directions, escapement mechanism for controlling the movements of said typewriter carriage in both directions, and escapement operating mechanism which is operated by the same mechanism which operates the type bars.

9. In an automatic mechanism for operating typewriters, the combination of a perforated controller strip, mechanism controlled thereby for operating the type bars of a typewriter, pneumatic cylinders, pistons therein, means actuated by the pistons for moving the typewriter carriage in opposite directions, a vacuum chamber, valve-regulated passageways communicating between said vacuum chamber and said cylinders, means controlled by said perforated controller strip for operating the valves in said pasageways, escapement mechanism controlling the movements of the carriage in both directions, and escapement operating mechanism which is operated by the same mechanism which operates the type bars, substantially as specified.

10. In automatic mechanism for operating typewriters the combination of a perforated controller strip, means controlled thereby for operating the type bars of a typewriter, a double acting escapement for controlling the movement of the typewriter carriage in both directions, escapement operating mechanism adapted to be operated by the same mechanism which operates the type bars, two devices adapted respectively to traverse said carriage in opposite directions, and means controlled by said controller strip for alternately throwing one of said devices into operation and for throwing the other devices out of operation.

11. An automatic mechanism for operating typewriters comprising a series of movable trips, members on which the trips are mounted, a perforated strip adjacent to each member, means to draw the trips through the perforations of the strips, a series of levers designed to be tilted by said trips, means actuated by certain of said levers for operating the type bars, a rock shaft adapted to move the carriage of a typewriter horizontally, and means connecting one of said tilting levers with said rock shaft, as set forth.

12. In automatic mechanism for operating typewriters, the combination of two levers whose rear ends are adjacent, means engaging the front ends of said levers for severally tilting them, a lever of the typewriter, a single operating device connected therewith and having a pin and slot connection with the rear ends of both of the two first mentioned levers, whereby when either of said levers is tilted the other remains immovable but the typewriter lever is rocked.

13. In automatic mechanism for operating typewriters, the combination with a lever of a typewriter and an operating device connected with and depending therefrom, of two levers each having a slot and pin connection with said operating device, two movable perforated strips, and two sets of devices severally controlled by said strips for severally tilting the two levers last mentioned.

14. In automatic mechanism for operating typewriters, the combination of two rotatable cylinders, movable trips mounted thereon, a perforated strip running over each cylinder, means for causing the trips to project outward from said cylinder through the perforations in said strips, two series of levers adapted to be severally engaged by and tilted by the trips on said two cylinders, a single connecting device with which a lever of each series engages, and a typewriter lever with which said connecting device is also connected.

15. In automatic mechanism for operating typewriters, the combination of two rotatable cylinders, a plurality of movable trips mounted on each, a perforated strip running over each cylinder and movable with it, mechanism adapted to cause said trips to project through perforations in said strips, two series of levers, one associated with each cylinder and adapted to be tilted by the trips carried thereby, a series of operating levers for the typewriting machines, and a single set of means connecting each of said typewriter levers with two levers, one from each of the two series specified.

16. An automatic mechanism for operating typewriters comprising a series of movable trips, members on which the latter are mounted, a perforated strip adjacent to each member, an electro-magnet designed to draw the trips through perforations of the strips, a series of levers adapted to be tilted by the trips, means actuated by said levers for operating the type bars of a typewriter, pneumatic cylinders, a piston mounted in each cylinder, connections therewith designed to move the carriage of a typewriter in opposite directions, a vacuum chamber, a valve casing, a rocking valve mounted therein having a duct and a relief port therein, bars pivotally connected eccentrically upon said valve and adapted to be actuated by said levers, pipes leading from the vacuum chamber to said valve casing and from the latter to said cylinders, as set forth.

17. In automatic mechanism for operating typewriters, the combination of two rotatable cylinders each carrying longitudinal rows of movable trips, a perforated strip associated with each cylinder and movable in unison with and close to the same, means for drawing the trips outward through perforations in the strips, levers arranged to be engaged and tilted by the projected trips, and mechanism whose operation is controlled by some of said levers for periodically disconnecting one cylinder from a motor and connecting the other with a motor.

18. In automatic mechanism for operating typewriters, the combination of two rotatable cylinders each carrying longitudinal rows of movable trips, a perforated strip associated with each cylinder and movable in unison with and close to the same, means for drawing the trips outward through the perforations in the strips, levers arranged to be engaged and tilted by the projected trips, means for rotating said cylinders, and mechanism adapted to be operated by a lever which is in turn operated by a trip on the rotating cylinder for disconnecting said rotating cylinder from said rotating means and for connecting the other cylinder with said means.

19. An automatic mechanism for operating typewriters comprising rotatable cylinders, shafts with which the cylinders rotate, a series of movable trips mounted thereon, a perforated strip designed to move adjacent to each cylinder, an electro-magnet adapted to draw the trips through the perforations of the strips, tilting levers actuated by said trips, a motor, a driven shaft, a pulley fixed thereto, connections between said pulley and cylinders for driving the same in opposite directions, rock shafts mounted in suitable bearings, clutch mechanism intermediate said rock shafts and shafts upon which the cylinders are mounted, collars splined upon said rock shafts, and means carried by said pulley upon the driven shaft for rocking said shafts, as set forth.

20. An automatic mechanism for operating typewriters comprising rotatable cylinders, shafts with which the cylinders rotate, a series of movable trips mounted thereon, a perforated strip designed to move adjacent to each cylinder, an electro-magnet adapted to draw the trips through the perforations of the strips, tilting levers actuated by said trips, a motor, a driven shaft, a pulley fixed thereto, connections between said pulley and cylinders for driving the same in opposite directions, rock shafts mounted in suitable bearings, clutch mechanism intermediate said rock shafts and shafts upon which the cylinders are mounted, collars splined upon said rock shafts, trips upon said pulley, means actuated by said levers for throwing said clutch collars into the path of said trips upon the pulley, whereby the rock shafts may be operated to throw one cylinder or the other into or out of gear, as set forth.

21. An automatic mechanism for operating typewriters comprising rotatable cylinders, shafts with which the cylinders rotate, a series of movable trips mounted thereon, a perforated strip designed to move adjacent to each cylinder, an electro-magnet adapted to draw the trips through the perforations of the strips, tilting levers actuated by said trips, a motor, a driven shaft, a pulley fixed thereto, connections between said pulley and cylinders for driving the same in opposite directions, rock shafts mounted in suitable bearings, clutch mechanism intermediate said rock shafts and shafts upon which the cylinders are mounted, collars splined upon said rock shafts, spring-pressed trips mounted upon said pulley, means actuated by said levers for moving said clutch collars into the path of said spring-pressed trips, whereby the rock shafts may be operated to throw one or the other cylinders into or out of gear, as set forth.

22. An automatic mechanism for operating typewriters comprising rotatable cylinders, shafts with which the cylinders rotate, a series of movable trips mounted thereon, a perforated strip designed to move adjacent to each cylinder, an electro-magnet adapted to draw the trips through the perforations of the strips, tilting levers actuated by said trips, a motor, a driven shaft, a pulley fixed thereto, connections between said pulley and cylinders for driving the same in opposite directions, rock shafts mounted in suitable bearings, clutch mechanism intermediate said rock shafts and shafts upon which the cylinders are mounted, collars splined upon said rock shafts, spring-pressed trips mounted upon said pulley, a third rock shaft, an arm fastened to the latter, connections between said arm and one of said tilting levers, an arm fixed to the last named rock shaft which is connected to one of said levers and engaging a clutch collar and designed to move the latter in the path of said trip upon the pulley, as set forth.

23. An automatic mechanism for operating typewriters comprising rotatable cylinders, shafts with which the cylinders rotate, a series of movable trips mounted thereon, a perforated strip designed to move adjacent to each cylinder, an electro-magnet adapted to draw the trips through the perforations of the strips, tilting levers actuated by said trips, a motor, a driven shaft, a pulley fixed thereto, connections between said pulley and cylinders for driving the same in opposite directions, rock shafts mounted in suitable bearings, a collar splined to each rock shaft, an arm projecting from each collar, an antifriction roller upon each arm, means for moving said clutch collars as said levers are tilted, trips carried by said pulley and adapted to contact with said antifriction rollers, whereby the rock shafts may be operated to throw one cylinder or the other into or out of gear, as set forth.

In testimony whereof I hereunto affix my signature in the presence of two witnesses.

THOMAS A. McCALL.

Witnesses:
ROBT. J. ODELL,
J. H. PILLING.